No. 836,035. PATENTED NOV. 13, 1906.
A. C. HENDRICKS.
CLUTCH MECHANISM.
APPLICATION FILED JAN. 20, 1906.

2 SHEETS—SHEET 1.

Adam C. Hendricks, Inventor,

Witnesses
Howard D. Orr.
B. G. Foster

By E. G. Siggers,
Attorney

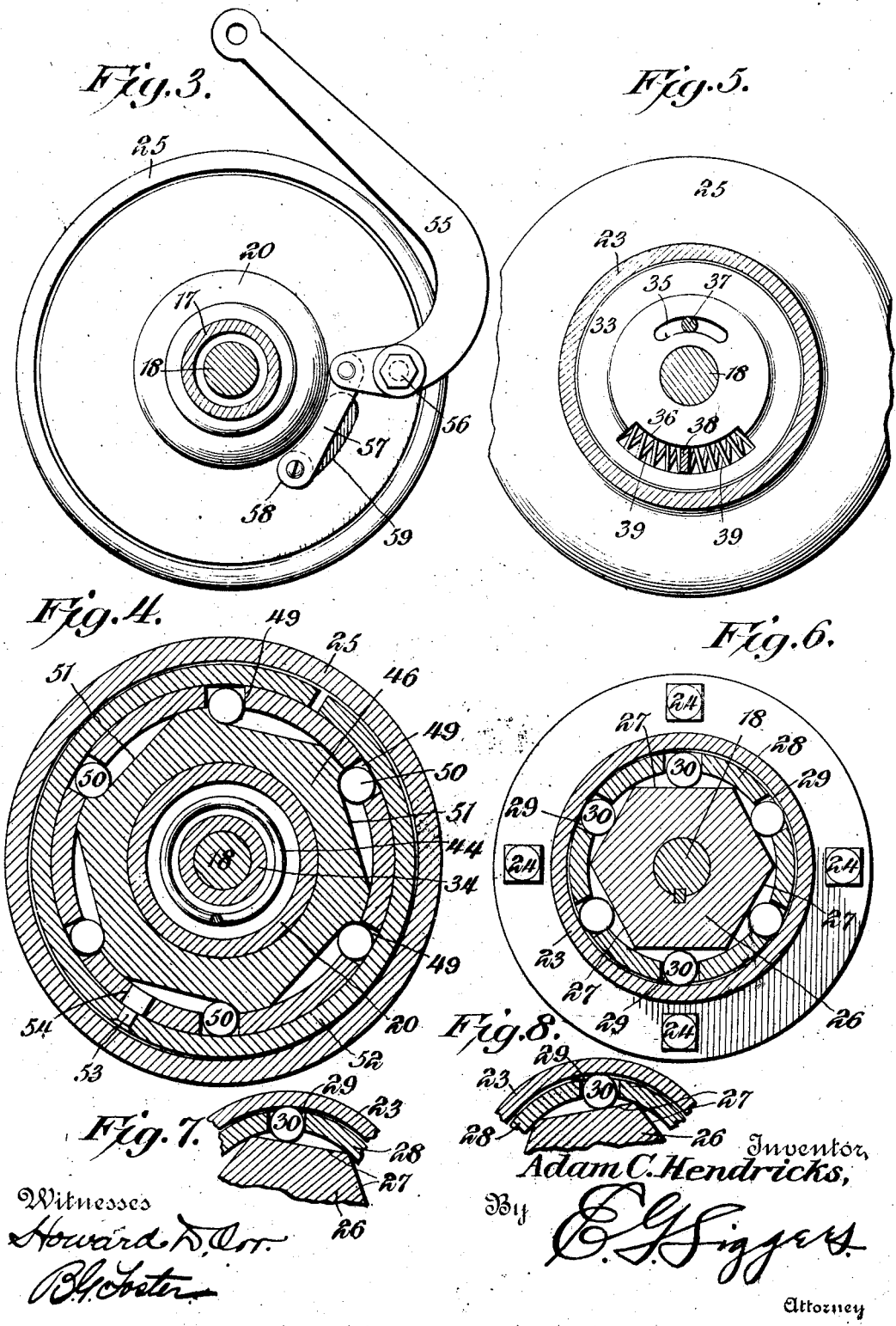

UNITED STATES PATENT OFFICE.

ADAM C. HENDRICKS, OF HAGERSTOWN, MARYLAND.

CLUTCH MECHANISM.

No. 836,035.   Specification of Letters Patent.   Patented Nov. 13, 1906.

Application filed January 20, 1906. Serial No. 297,070.

*To all whom it may concern:*

Be it known that I, ADAM C. HENDRICKS, a citizen of the United States, residing at Hagerstown, in the county of Washington and State of Maryland, have invented a new and useful Clutch Mechanism, of which the following is a specification.

The invention relates to means for clutching two members against free independent or relative movement or rotation, and while particularly intended for use in connection with the driving mechanism of automobiles and the like is not necessarily limited thereto, but can be successfully employed in various types of machinery.

One of the particular objects is to provide in driving mechanism for self-propelled vehicles clutch means that will permit the use of a continuous undivided axle, thereby eliminating the usual expensive and intricate gearing and trusses employed with divided axles, will effect a secure automatic driving connection between the axle and the wheels when the driving-axle is operated in either direction, and will permit the overrunning of the wheels in either direction, and therefore the turning of corners or curves without undue friction.

Another and important object is to provide clutch mechanism that is very simple and inexpensive, is composed of parts not liable to become deranged, and, furthermore, is so constructed that none of said parts is subjected to excessive strain or wear.

The preferred embodiment of the invention is illustrated in the accompanying drawings, wherein—

Figure 1 is a top plan view of the driving-axle and wheels of an automobile, showing the casing therefor and illustrating the improved clutch mechanism. Fig. 2 is a detail sectional view, on an enlarged scale, through said clutch mechanism. Fig. 3 is a cross-sectional view on the line 3 3 of Fig. 2.
Fig. 4 is a similar view on the line 4 4 of Fig. 2. Fig. 5 is a cross-sectional view on the line 5 5 of Fig. 2. Fig. 6 is a cross-sectional view on the line 6 6 of Fig. 2. Figs. 7 and 8 are detail sections illustrating the manner in which the clutch mechanism operates when the shaft is rotated in opposite directions.

Like numerals of reference designate corresponding parts in all the figures of the drawings.

In the form shown, a tubular casing 17 is employed, through which extends a single rotatable driving member, shaft, or axle 18, which shaft or axle may also be considered in the nature of a support. The casing 17 is divided, and between the ends of the sections may be located an ordinary driving sprocket-wheel 19, fixed to the shaft. The outer ends of the casings 17 are slightly enlarged, as shown at 20, and ball-bearings 21 for the shaft are preferably located therein, these bearings being of any suitable nature. Driven members or wheels 22 are loosely journaled on the ends of the shaft 18, which ends project beyond the casing, as shown, and mechanism is employed for independently connecting each wheel to the shaft. As these clutch mechanisms are duplicates in all respects, a description of one is believed to be sufficient.

A sleeve 23 is bolted, as shown at 24, or otherwise secured to the wheel 22, said sleeve extending over a projecting portion of the shaft 18 and having an enlarged portion 25, that surrounds the enlarged portion 20 of the casing. Keyed or otherwise secured to the shaft 18 within the sleeve 23 is a cam element 26, which, as shown in Fig. 6, is provided with a plurality of cam-surfaces 27, extending in opposite directions equally from the axis of rotation of the shaft. Associated with this cam element is a guide element in the form of a ring 28, surrounding said cam element and having openings 29 therethrough, which openings are located over the cam-surfaces 27. Clamping devices in the form of rollers 30 are arranged in the openings 29 and have their inner sides bearing against the cam-surfaces 27, their outer sides being arranged to move into and out of clamping co-action with the inner surface of the sleeve 23. Thus when the rollers are centrally upon the cam-surfaces 27 they will be out of binding engagement with the sleeve, as shown in Fig. 6; but if moved toward either end of said surfaces they will thereupon be brought into binding engagement with the sleeve, as shown in Figs. 7 and 8. To secure these movements, the guide-ring and cam element are relatively movable, and for effecting this relative movement the following mechanism is preferably employed:

The ring 28 is provided at its inner side with an inwardly-extending annular flange 31, surrounding a hub portion 32 on the cam element, and arranged directly adjacent to the flange and hub portion is a disk-head 33 of a retarding device having a thimble 34, that is journaled on the shaft 18 and extends into the enlarged portion 20 of the stationary casing. The disk-head 33 is provided in its outer side with curved slots 35 and 36. A projection or pin 37, carried by the cam element, projects into the slot 35, while a flat lug 38, carried by the flange portion 31 of the guide-ring, projects into the other slot 36. Coiled springs 39 are located in said slot 36 on opposite sides of the lug 38, and thus a yielding connection is secured between the guide-ring and the retarding device, allowing a limited movement of the retarding device with respect to the ring, the pin 37 also allowing a limited movement of the cam element with respect to the retarding device. A stationary or non-rotary bearing-wall 40 is secured to the end of the enlarged portion 20 of the stationary casing by pins 41, which engage in said enlarged portion. This bearing-wall has a central opening through which the shaft and thimble 34 pass, and a washer 42 is preferably interposed between the wall 40 and the disk-head 33 of the retarding device. A friction-washer 43 bears against the inner side of the wall 40 and is urged thereagainst by a coiled spring 44, said spring surrounding the thimble 34 and having one end bearing against the washer 43, while its other end bears against a nut 45, threaded onto the inner end of the thimble.

It is believed that the operation of this portion of the structure can now be made clear. Assuming that the shaft 18 is stationary and that the guide-ring is disposed with the openings 29 centrally of the cam-surfaces 27, it will be apparent that the wheel will be unclutched from the shaft, and consequently is free to revolve in either direction. This will be evident by reference to Fig. 6. If, however, the shaft 18 is started, the cam element 26 will of course be revolved with it. The retarding device, however, will for an instant remain stationary, as the friction caused by the spring 44 against the stationary wall 40 will prevent its movement. Consequently the springs 39 in the slots 36 bearing against the lug 38 will also for an instant maintain the guide-ring 28 against movement. As a result the cam element will move with respect to both the ring and the rollers and said rollers will be forced outwardly into binding engagement with the sleeve—as shown, for instance, in Fig. 7. During this movement, however, one of the springs 39 will be compressed, and because of the connection between the retarding device, the cam element, and the guide-ring these three parts will afterward revolve together. It will thus be seen that the driven member or wheel will be securely and automatically clutched to the driving-shaft. At the same time if the speed of the wheel should exceed that of the shaft the guide-ring will be slightly moved with relation to the cam element, so that the wheel can readily revolve as long as this excessive speed is maintained. As soon, however, as the speed of the shaft reaches that of the wheel the clutching action will again take place. In view of the fact, therefore, that both of the wheels are independently connected to this single shaft or axle it will be apparent that in turning curves or corners the outer wheel can overrun the inner one without any strain or friction on the parts, and therefore a divided shaft with differential gearing is unnecessary. If the direction of rotation of the shaft is reversed, the first action is to unclutch it from the wheel, but as the retarding device is again held for an instant it will in turn hold the guide-ring so that the rollers will be carried to the opposite ends of the cam-surfaces, and consequently the wheel will be reclutched for the reverse movement. This, it is believed, will be apparent by reference to Figs. 7 and 8. Furthermore, when this reverse movement takes place the wheels are still free to overrun the shaft. It will thus be seen that by means of the simple structure set forth a single shaft may be employed without differential gearing, and yet the mechanism allows the various necessary movements of the wheels or driven members.

For the purpose of securing the driven members against movement or for stopping them the following clutch mechanism is preferably employed: The enlarged portion 20 of the casing constitutes a support for a rotatable cam element 46, that is located within the enlarged portion 25 of the sleeve. The said enlarged portion 20 of the casing has an annular outstanding wall 47, that closes the inner end of the sleeve portion 25 and is provided with an inwardly-extending stationary guide element 48 in the form of a ring that surrounds the cam element 46 and has openings 49 therethrough. Rollers 50, located in the openings, have their inner sides operating against the cam-surfaces 51 of the cam elements 46, while their outer sides are arranged to bear against a shoe in the form of a split clutch-ring 52, surrounding the guide-ring 48 and secured thereto, as shown at 53. This securing means is preferably in the form of a lug riveted to the shoe and having a detachable engagement in an opening 54 in the ring. The shoe is interposed between the guide-ring 48 and the sleeve portion 25 and is arranged to be spread outwardly against the inner face of said sleeve portion by the clamping-rollers 50 when said clamping-rollers are moved outwardly upon the rotation of the cam element 46. This rotation is accomplished by means of a suitable lever 55, fulcrumed, as shown at 56, upon the wall 47 of the casing and having connected thereto a link 57, that is pivoted to a lug 58 on the cam element, which lug projects through a slot 59 in the wall 47. It will thus be seen that if the lever 55 is operated the cam element 46 will be partially revolved and the clamping-rollers will be moved outwardly, thereby spreading the shoe and causing it to be brought to binding engagement with the surrounding portion of the sleeve. It will of course be understood that the two levers shown in Fig. 1 will be operated simultaneously to cause this clutching action.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is—

1. In mechanism of the class described, the combination with a stationary member, of a rotatable member, another rotatable member having a sleeve surrounding a portion of the first-mentioned rotatable member and a portion of the stationary member, and clutch mechanism mounted on said first-mentioned rotatable member and on the stationary member and movable into and out of coaction with the sleeve.

2. In mechanism of the class described, the combination with a stationary member, of a shaft rotatably mounted thereon, a rotatable member having a sleeve surrounding the stationary member and shaft, clutch mechanism mounted on the shaft within the sleeve and movable into and out of coaction with the inner face of the sleeve, and clutch mechanism mounted on the stationary member and movable into and out of coaction with the inner face of the sleeve.

3. In mechanism of the class described, the combination with a casing, of a shaft journaled therein, and projecting therefrom, a wheel loosely mounted on the projecting portion of the shaft and having a sleeve surrounding a portion of said shaft and a portion of the casing, clutch mechanism carried by the shaft and interposed between the casing and the wheel, said clutch mechanism being located within the sleeve and movable into and out of coaction with the inner face thereof, and other clutch mechanism mounted on the casing and arranged within the sleeve, said latter clutch mechanism being also movable into and out of coaction with the inner face of the sleeve.

4. In mechanism of the class described, the combination with a casing, of a shaft journaled therein and projecting therefrom, a wheel loosely journaled on the shaft and having a sleeve portion, a cam fixed to the shaft and located within the sleeve portion, a guide-ring surrounding the cam and having openings therethrough, means for effecting the movement of the ring with respect to the cam, rollers borne against by the cam, said rollers extending through the ring and coacting with the sleeve, a cam rotatably mounted on the casing and arranged within the sleeve, a fixed ring surrounding the latter cam, rollers extending through the ring and coöperating with the cam, and means for effecting the movement of the cam upon the casing.

5. In mechanism of the class described, the combination with a driving member, of a driven member, relatively movable cam and guide elements, a clamping device loosely located in the guide element and positively operated by the cam element upon the relative movement of said elements to clutch the driving and driven members, and friction means separate from the driven element for effecting the automatic relative movement of the cam and guide elements to cause the clamping device to clutch the driving and driven members.

6. In mechanism of the class described, the combination with a driving member, of a driven member, relatively movable cam and guide elements, a loose clamping device operated upon by the cam and guide elements upon their relative movement, to clutch the driving and driven members, and friction means for effecting the automatic relative movement of the cam and guide elements to cause the clamping device to clutch the driving and driven members, said means including a bearing that is stationary with respect to the cam and guide, and a device movable with both the cam and guide and having a frictional engagement with the bearing.

7. In mechanism of the class described, the combination with a driving member, of a driven member, relatively movable cam and guide elements, a loose clamping device operated upon by the cam and guide element upon their relative movement to clutch the driving and driven members, and friction means for effecting the automatic relative movement of the cam and guide elements to cause the clamping device to clutch the driving and driven members, said means including a bearing that is stationary with respect to the cam and guide, and a device movable with respect to and movable with both the cam and guide, said device having a frictional engagement with the bearing.

8. In mechanism of the class described, the combination with a driving member, of a driven member, relatively movable cam and guide elements, a loose clamping device operated upon by the cam and guide elements upon their relative movement to clutch the driving and driven members, and friction means for effecting the automatic relative movement of the cam and guide elements to cause the clamping device to clutch the driving and driven members, said means including a bearing that is stationary with respect to the cam and guide, and a device movable with the cam and guide and having a yielding connection with one, said device also having a frictional engagement with the bearing.

9. In mechanism of the class described, the combination with rotatable driving and driven members, of relatively movable cam and guide elements rotatable with the members, a clamping device operated by the cam and guide elements on their relative movements, a non-rotary friction-bearing, a device for effecting the relative movement of the cam and guide elements, and means for effecting a yielding engagement between said device and the non-rotary friction-bearing.

10. In mechanism of the class described, the combination with a rotatable driving and driven member, of relatively movable cam and guide elements rotatable with the members, a clamping device operated by the cam and guide elements on their relative movements, a non-rotary friction-bearing, a retarding device for effecting the relative movement of the cam and guide elements, and a spring interposed between the device and the non-rotary bearing.

11. In mechanism of the class described, the combination with a support including a wall, of rotatable driving and driven members associated therewith, a clutch for connecting the members, including relatively movable cam and guide elements rotatable with the members, a retarding device for effecting the relative movement of the elements, said device including a thimble extending through the wall and having a connection with one of the elements, and a spring mounted on the thimble and having a bearing against the stationary wall.

12. In mechanism of the class described, the combination with a support including a stationary wall, of a driving-shaft journaled on the support, a wheel loosely mounted on the shaft, clutch mechanism for connecting the shaft to the wheel, said mechanism including a cam element and a ring element surrounding the same, means for effecting the relative movement of the cam and ring elements, said means comprising a retarding device associated with the elements and having a thimble mounted on the shaft and extending through the stationary wall of the support, a friction device mounted on the thimble, and a spring bearing against the friction device and thimble and surrounding said thimble.

13. In mechanism of the class described, the combination with rotatable driving and driven members, of means for clutching the members together, said means including relatively movable cam and guide elements rotatable with the members, a device for effecting the relative movement of the cam and guide elements, said device being rotatable with both elements and with respect to both elements and being furthermore rotatable with the driving and driven elements, and connections between the device and both elements to limit their relative movements.

14. In mechanism of the class described, the combination with rotatable driving and driven members, of means for clutching the same together, said means including relatively movable cam and guide elements rotatable with the members, a retarding device for effecting the relative movements of the elements, said retarding device being rotatable with the elements and having slots, and projections carried by the cam and guide elements and engaging in the slots.

15. In mechanism of the class described, the combination with rotatable driving and driven members, of means for clutching the same together, said means including relatively movable cam and guide elements rotatable with the members, a retarding device for effecting the relative movements of the elements, said retarding device being rotatable with the elements and having slots, projections carried by the cam and guide elements and engaging in the slots, and a spring located in one of the slots and bearing against the projection therein.

16. In mechanism of the class described, the combination with a rotatable driving-shaft, of a rotatable driven member associated therewith, means for clutching the shaft to the member, said means including relatively rotatable cam and guide-ring elements that are rotatable with the shaft and driven member, a retarding device mounted on the shaft and having slots, projections carried by the cam and guide-ring elements and located in the slots, and a spring arranged in one of the slots and bearing against the projection therein.

17. In mechanism of the class described, the combination with a casing having a stationary bearing-wall, of a shaft journaled in the casing and extending through the wall, a driven member associated with the shaft, means for clutching the shaft to the driven member, said means including a cam element, and a guide-ring surrounding the element and movable with respect thereto, clamping-rollers associated with the cam and guide-ring elements, a retarding device mounted on the shaft, and including a thimble extending through the stationary bearing wall, said thimble having a head provided with slots, projections carried by the guide-ring and the cam elements and located in the slots, and a friction device having an engagement with the bearing-wall, said friction device having a yielding connection with the thimble.

18. In mechanism of the class described, the combination with rotatable driving and driven members, of cam and guide elements rotatable therewith and relatively movable in opposite directions, a clamping device operated by the elements upon their relative movements in opposite directions, and means independent of the driven member for automatically effecting the relative movements of the cam and guide elements in opposite directions upon the corresponding movements of the driving members.

19. In mechanism of the class described, the combination with rotatable driving and driven members, of relatively movable cam and guide elements rotatable therewith, a clamping device operated by the elements upon their relative movement, a friction device movably supported on and by the driving member and being rotatable therewith, said device being associated with one of the elements for initially holding it against movement with the driving member, and means frictionally engaging the device for resisting its rotation with the driving member.

20. In mechanism of the class described, the combination with rotatable driving and driven members, of relatively movable cam and guide elements supported on and carried by the driving member and being also capable of rotation therewith, a clamping device operated by the elements upon their relative movement, a friction device movably supported on and by the driving member and being capable of rotation therewith, said friction device being associated with one of the elements for initially holding it against movement with the driving member and being rotated with the other member, and means that frictionally engages said device for resisting its rotation with the driving member.

21. In mechanism of the class described, the combination with rotatable driving and driven members rotatable in opposite directions, of mechanism for automatically clutching the driven member to the driving member upon the rotation of the latter in either direction, said means including relatively movable cam and guide elements, a retarding device loosely mounted on one of the members and movably associated with one of the elements to effect an initial movement thereof slower than the other element upon the initial movement of the driving member in either direction, and friction means engaging the retarding device to initially hold it against movement with the member that carries it.

22. In mechanism of the class described, the combination with rotatable driving and driven members rotatable in opposite directions, of mechanism for automatically clutching the driven member to the driving member upon the rotation of the latter in either direction, said means including relatively movable cam and guide elements, a retarding device associated with one of the elements to effect an initial movement thereof slower than the other element upon the initial movement of the driving member in either direction, said retarding device having a limited movement independent of one of the elements, and a yielding connection between said element and the retarding device.

23. In mechanism of the class described, the combination with rotatable driving and driven members rotatable in opposite directions, of mechanism for automatically clutching the driven member to the driving member upon the rotation of the latter in either direction, said means including relatively movable cam and guide elements, a retarding device associated with one of the elements to effect an initial movement thereof slower than the other element upon the initial movement of the driving member in either direction, said retarding device having a limited movement independent of one of the elements and having a slot, a friction projection carried by said element and extending into the slot, and springs located in the slot on opposite sides of the projection.

24. In mechanism of the class described, the combination with a driving member, of a driven member, clutch mechanism for connecting the members, said clutch mechanism comprising a cam element, a guide-ring surrounding the same and having openings, and rollers located in openings and operated by the cam element upon the relative movement of the cam element and ring, a retarding device rotatable with the cam element and ring, friction means for resisting the movement of the retarding device, said retarding device having slots, projections carried by the cam element of the ring and engaging in the slots, and springs located in one of the slots and bearing against the opposite sides of the projections therein.

25. In mechanism of the class described, the combination with a casing including a bearing-wall, a shaft journaled in the casing and projecting therefrom, a rotatable member loosely journaled on the shaft and having a sleeve portion, a cam fixed to the shaft within the sleeve portion, a guide-ring surrounding the cam and having openings therethrough, clamping-rollers mounted in the guide-ring, said rollers being operated upon by the cam and coöperating with the sleeve portion, a retarding device comprising a thimble extending through the bearing-wall and having a head at one end provided with slots, projections carried by the ring and cam and located in the slots, a bearing-washer located on the thimble and engaging the bearing-wall, and a coiled spring located on said thimble and bearing against the washer.

26. In mechanism of the class described, the combination with a rotatable driving-shaft, of a driven wheel loosely journaled on the shaft, and means for clutching the wheel to the shaft, said means including a cam element secured to the shaft, another element rotatably mounted with respect to the cam element, a clamping device carried by the latter element and operated on the relative movement of said elements, a retarding device mounted on the shaft and having a limited rotatable movement thereon, said retarding device being connected to said elements for relatively moving the same, and friction means engaging the retarding device for opposing its movement.

27. In mechanism of the class described, the combination with a rotatable driving-shaft, of a driven wheel loosely journaled on the shaft, and means for clutching the wheel to the shaft, said means including relatively movable elements mounted on the shaft and a clamping device operated by the elements on their relative movements, a retarding device mounted on the shaft for effecting the relative rotation of the elements, and means engaging the retarding device for resisting its rotation with the shaft.

28. In mechanism of the class described, the combination with a rotatable driving-shaft, of a driven wheel loosely journaled on the shaft, and means for clutching the wheel to the shaft, said means including relatively movable elements mounted on the shaft, a clamping device operated by the elements on their relative movements, a retarding device also movably mounted on the shaft for effecting the relative movement of the elements, and stationary holding means, having a frictional engagement with the retarding device, for resisting its movement with the shaft.

In testimony that I claim the foregoing as my own I have hereto affixed my signature in the presence of two witnesses.

ADAM C. HENDRICKS.

Witnesses:
 JOHN H. SIGGERS,
 BLANCHE J. KALDENBACK.